United States Patent
Chun et al.

(10) Patent No.: US 8,848,662 B2
(45) Date of Patent: Sep. 30, 2014

(54) METHOD OF PERFORMING A HANDOVER PROCEDURE IN WIRELESS COMMUNICATION SYSTEM

(75) Inventors: Sung-Duck Chun, Gyeonggi-Do (KR); Seung-June Yi, Gyeonggi-Do (KR); Sung-Hoon Jung, Gyeonggi-Do (KR); Sung-Jun Park, Gyeonggi-Do (KR)

(73) Assignee: LG Electronics Inc., Seoul (KR)

( * ) Notice: Subject to any disclaimer, the term of this patent is extended or adjusted under 35 U.S.C. 154(b) by 134 days.

(21) Appl. No.: 13/259,074

(22) PCT Filed: Apr. 23, 2010

(86) PCT No.: PCT/KR2010/002565
§ 371 (c)(1),
(2), (4) Date: Sep. 22, 2011

(87) PCT Pub. No.: WO2010/126256
PCT Pub. Date: Nov. 4, 2010

(65) Prior Publication Data
US 2012/0039302 A1     Feb. 16, 2012

Related U.S. Application Data

(60) Provisional application No. 61/173,181, filed on Apr. 27, 2009, provisional application No. 61/184,833, filed on Jun. 7, 2009, provisional application No. 61/185,574, filed on Jun. 9, 2009, provisional application No. 61/186,389, filed on Jun. 12, 2009.

(51) Int. Cl.
*H04W 36/08*     (2009.01)
*H04W 36/00*     (2009.01)

(52) U.S. Cl.
CPC .................................. *H04W 36/0027* (2013.01)
USPC .......................................................... 370/331

(58) Field of Classification Search
CPC ....... H04W 4/06; H04W 80/04; H04W 84/12; H04W 88/08; H04W 84/18; H04W 72/04; H04W 76/00; H04W 72/0446; H04W 72/0453; H04W 36/18; H04W 36/0011; H04W 36/14; H04W 36/08; H04W 8/26
USPC .......... 370/328–331, 349, 312; 455/436, 438, 455/440

See application file for complete search history.

(56) References Cited

U.S. PATENT DOCUMENTS

| 2004/0185852 | A1* | 9/2004 | Son et al. ........................ 455/438 |
| 2005/0192011 | A1* | 9/2005 | Hong et al. .................... 455/440 |

(Continued)

FOREIGN PATENT DOCUMENTS

| KR | 1020070046698 | 5/2007 |
| KR | 1020080044679 | 5/2008 |
| KR | 1020080085986 | 9/2008 |

*Primary Examiner* — Kwang B Yao
*Assistant Examiner* — Syed M Bokhari
(74) *Attorney, Agent, or Firm* — Lee, Hong, Degerman, Kang & Waimey

(57) ABSTRACT

The present invention relates to a wireless communication system and UE providing wireless communication services, and a method of effectively performing a handover procedure in an evolved Universal Mobile Telecommunications System (UMTS) that has evolved from a Universal Mobile Telecommunications System (UMTS), a Long Term Evolution (LTE) system, or a LTE-A (LTE-Advanced) system and it may be an object of the present invention to perform the handover procedure without terminating a data transmission between a terminal and a base station by utilizing carrier aggregation scheme, which allows a high-speed data transmission by using a plurality of frequencies.

3 Claims, 5 Drawing Sheets

(56) References Cited

U.S. PATENT DOCUMENTS

2007/0161374 A1* 7/2007 Kienstra et al. .............. 455/436
2009/0054066 A1* 2/2009 Jang et al. ................... 455/436
2009/0310563 A1* 12/2009 Chou et al. ................... 370/331
2010/0111039 A1* 5/2010 Kim et al. .................... 370/331
2010/0260142 A1* 10/2010 Jung et al. ................... 370/331
2010/0303039 A1* 12/2010 Zhang et al. ................. 370/331
2011/0269469 A1* 11/2011 Xiao et al. ................... 455/436
2014/0146789 A1* 5/2014 Chou et al. ................... 370/331

* cited by examiner

Component Carrier

5 Component Carriers → 100 MHz

METHOD OF PERFORMING A HANDOVER PROCEDURE IN WIRELESS COMMUNICATION SYSTEM

CROSS-REFERENCE TO RELATED APPLICATIONS

This application is the National Stage filing under 35 U.S.C. 371 of International Application No. PCT/KR2010/002565, filed on Apr. 23, 2010, which claims the benefit of U.S. Provisional Application Ser. Nos. 61/173,181, filed on Apr. 27, 2009, 61/184,833, filed on Jun. 7, 2009, 61/185,574, filed on Jun. 9, 2009, and 61/186,389, filed on Jun. 12, 2009, the contents of which are hereby incorporated by reference herein in their entirety.

TECHNICAL FIELD

The present invention relates to a wireless communication system and user equipment providing wireless communication services, and a method of transmitting and receiving data between a terminal and a base station in an evolved Universal Mobile Telecommunications System (UMTS) that has evolved from a Universal Mobile Telecommunications System (UMTS), a Long Term Evolution (LTE) system, or a LTE-A (LTE-Advanced) system and more particularly, to a method of effectively performing a handover procedure without terminating the data transmission between the terminal and the base station.

BACKGROUND ART

First, the LTE system is a mobile communication system that has evolved from a UMTS system, and the standard has been established by 3rd Generation Partnership Project (3GPP), which is an international standardization organization.

FIG. 1 is a view illustrating the network architecture of an LTE system, which is a mobile communication system to which the related art and the present invention are applied.

As illustrated in FIG. 1, the LTE system architecture can be roughly classified into an Evolved UMTS Terrestrial Radio Access Network (E-UTRAN) and an Evolved Packet Core (EPC). The E-UTRAN may include a user equipment (UE) and an Evolved NodeB (eNB, base station), wherein the connection between UE-eNB is called a Uu interface, and the connection between eNB-eNB is called an X2 interface. The EPC may include a Mobility Management Entity (MME) performing a control-plane function and a Serving Gateway (S-GW) performing a user-plane function, wherein the connection between eNB-MME is called an S1-MME interface, and the connection between eNB-S-GW is called an S1-U interface, and both connections may be commonly called an S1 interface.

A radio interface protocol is defined in the Uu interface which is a radio section, wherein the radio interface protocol is horizontally comprised of a physical layer, a data link layer, a network layer, and vertically classified into a user plane (U-plane) for user data transmission and a control plane (C-plane) for signaling transfer. Such a radio interface protocol can be typically classified into L1 (first layer) including a PHY layer which is a physical layer, L2 (second layer) including MAC/RLC/PDCP layers, and L3 (third layer) including a RRC layer as illustrated in FIGS. 2 and 3. Those layers exist as a pair in the UE and E-UTRAN, thereby performing data transmission of the Uu interface.

FIGS. 2 and 3 are exemplary views illustrating the control plane and user plane architecture of a radio interface protocol between UE and E-UTRAN in an LTE system, which is a mobile communication system to which the related art and the present invention are applied.

The physical layer (PHY) which is a first layer provides information transfer services to the upper layers using a physical channel. The PHY layer is connected to the upper Medium Access Control (MAC) layer through a transport channel, and data between the MAC layer and the PHY layer is transferred through the transport channel. At this time, the transport channel is roughly divided into a dedicated transport channel and a common transport channel based on whether or not the channel is shared. Furthermore, data is transferred between different PHY layers, i.e., between PHY layers at the transmitter and receiver sides.

Various layers exist in the second layer. First, the Medium Access Control (MAC) layer serves to map various logical channels to various transport channels, and also performs a logical channel multiplexing for mapping several logical channels to one transport channel. The MAC layer is connected to an upper Radio Link Control (RLC) layer through a logical channel, and the logical channel is roughly divided into a control channel for transmitting control plane information and a traffic channel for transmitting user plane information according to the type of information to be transmitted.

The Radio Link Control (RLC) layer of the second layer manages segmentation and concatenation of data received from an upper layer to appropriately adjust a data size such that a lower layer can send data to a radio section. Also, the RLC layer provides three operation modes such as a transparent mode (TM), an un-acknowledged mode (UM) and an acknowledged mode (AM) so as to guarantee various quality of services (QoS) required by each radio bearer (RB). In particular, AM RLC performs a re-transmission function through an automatic repeat and request (ARQ) function for reliable data transmission.

A Packet Data Convergence Protocol (PDCP) layer of the second layer performs a header compression function for reducing the size of an IP packet header which is relatively large in size and contains unnecessary control information to efficiently transmit IP packets, such as IPv4 or IPv6, over a radio section with a relatively small bandwidth. Due to this, information only required from the header portion of data is transmitted, thereby serving to increase the transmission efficiency of the radio section. In addition, in the LTE system, the PDCP layer performs a security function, which includes ciphering for preventing the third person's data wiretapping and integrity protection for preventing the third person's data manipulation.

A radio resource control (RRC) layer located at the uppermost portion of the third layer is only defined in the control plane. The RRC layer performs a role of controlling logical channels, transport channels and physical channels in relation to configuration, re-configuration, and release of Radio Bearers (RBs). Here, the RB denotes a logical path provided by the first and the second layers for transferring data between the UE and the UTRAN. In general, the establishment of the RB refers to a process of stipulating the characteristics of protocol layers and channels required for providing a specific service, and setting each of the detailed parameter and operation method thereof. The RB is divided into a signaling RB (SRB) and a data RB (DRB), wherein the SRB is used as a path for transmitting RRC messages in the C-plane while the DRB is used as a path for transmitting user data in the U-plane.

In general, a terminal (UE) is continuously moving around in a mobile communication system. Accordingly, an accessed cell by the terminal must be appropriately changed in order to improve a data transmission between the terminal and a base station. Here, a procedure for changing of the cell is referred as a handover procedure.

In a related art, the terminal is always accessed into a single frequency of a cell. Since the single frequency of the cell is only utilized in the related art, a handover procedure can be performed only after the terminal terminates its data transmission with the base station. Therefore, a decreasing of data transmission speed and a degrading of quality of service can be caused due to the termination of the data transmission in the related art.

DISCLOSURE OF INVENTION

Solution to Problem

Accordingly, an object of the present invention is to provide a method of effectively changing a cell in an operation of carrier aggregation (CA) of a LTE-A (LTE-Advanced) system.

In order to solve the foregoing problem, the present invention proposes a method of performing a handover procedure in a wireless communication and proposes a wireless mobile communication UE (or terminal) capable of performing such a method, which is characterized by including the steps of transferring data using a plurality of different frequencies; receiving a handover command from a serving cell, wherein the handover command includes target cell information, wherein the handover command further includes frequency information indicating a termination of the data transfer from the serving cell, and wherein the frequency information is related with at least one of the plurality of different frequencies; and transmitting a handover response to a target cell using the at least one of the plurality of different frequencies terminating the data transfer.

BRIEF DESCRIPTION OF DRAWINGS

The accompanying drawings, which are included to provide a further understanding of the invention and are incorporated in and constitute a part of this specification, illustrate embodiments of the invention and together with the description serve to explain the principles of the invention.

In the drawings.

MODE FOR THE INVENTION

One aspect of this disclosure relates to the recognition by the present inventors about the problems of the related art as described above, and further explained hereafter. Based upon this recognition, the features of this disclosure have been developed.

Although this disclosure is shown to be implemented in a mobile communication system, such as a UMTS developed under 3GPP specifications, this disclosure may also be applied to other communication systems operating in conformity with different standards and specifications.

The present invention may be applied to a 3GPP communication technology, particularly to a Universal Mobile Telecommunications System (UMTS), system, and a communication device and method thereof. However, the present invention is not limited to this, but may be applied to every wire/wireless communication to which technical spirit of the present invention can be applied.

According to a basic concept of the present invention, there is proposed a method of performing a handover procedure in a wireless communication and proposed a wireless mobile communication UE (or terminal) capable of performing such a method, which is characterized by including the steps of transferring data using a plurality of different frequencies; receiving a handover command from a serving cell, wherein the handover command includes target cell information, wherein the handover command further includes frequency information indicating a termination of the data transfer from the serving cell, and wherein the frequency information is related with at least one of the plurality of different frequencies; and transmitting a handover response to a target cell using the at least one of the plurality of different frequencies terminating the data transfer.

Hereinafter, the configuration and operation of preferred embodiments according to the present invention will be described with reference to the accompanying drawings.

Figure 1:
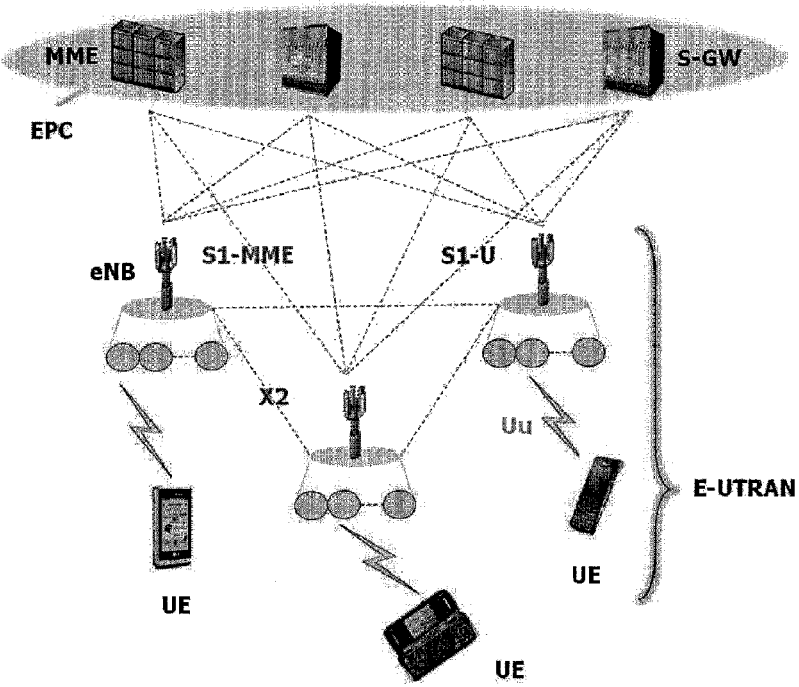
FIG. 1 is a view illustrating the network architecture of an LTE system, which is a mobile communication system to which the related art and the present invention are applied.
Figure 2:
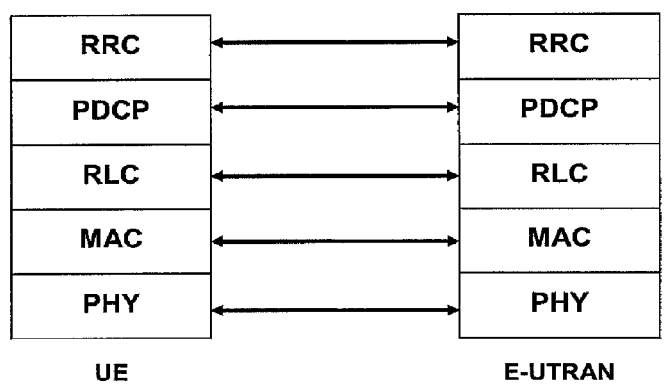
FIG. 2 is an exemplary view illustrating a control plane architecture in a radio interface protocol between UE and E-UTRAN in the related art.
Figure 3:
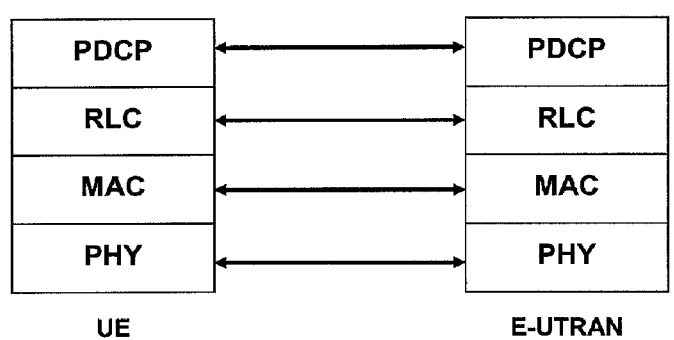
FIG. 3 is an exemplary view illustrating a user plane architecture in a radio interface protocol between UE and E-UTRAN in the related art.
Figure 4:
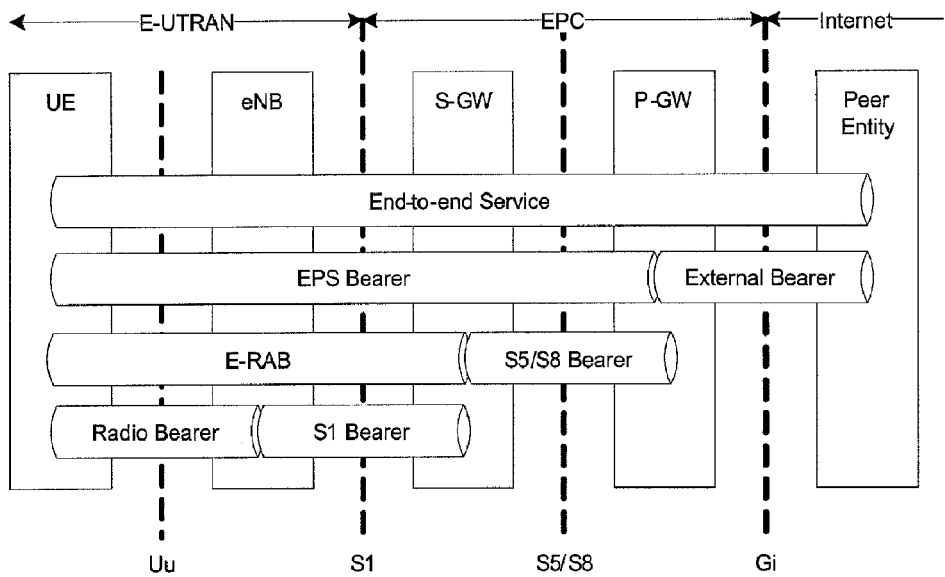
FIG. 4 is an exemplary view illustrating a bearer service architecture of the LTE system.

First, a bearer service architecture of the LTE system will be described. FIG. 4 is an exemplary view illustrating a bearer service architecture of the LTE system. Typically, Radio Bearer is a bearer provided in a Uu interface to support the user's service. In 3GPP, each bearer is defined for each interface as illustrated therein to guarantee independence between those interfaces. Specifically, bearers provided by LTE system are commonly called an Evolved Packet System (EPS) bearer, which can be divided into Radio Bearer, S1 Bearer, and the like, for each interface as illustrated in FIG. 4.

In FIG. 4, Packet Gateway (P-GW) is a network node for connecting between the LTE network and another network, and EPS Bearer provided by the LTE system is defined between UE and P-GW. The EPS Bearer is subdivided between individual nodes of the LTE system, and defined as Radio Bearer between UE-eNB, S1 Bearer between eNB-S-GW, and S5/S8 Bearer between S-GW and P-GW. Each bearer is defined through quality of service (QoS), and the QoS may include data rate, error rate, delay, and the like. Accordingly, QoS that should be totally provided by an LTE system is defined as a EPS bearer, and then each QoS is determined for each interface, and the bearer is set for each interface according to the QoS that should be provided by itself. Since the bearer of each interface is provided by dividing a total EPS bearer into sections, the EPS bearer and other bearers, such as Radio Bearer, S1 Bearer, and the like are all one-to-one relationships.

Hereinafter, a Long-Term Evolution Advanced (LTE-A) system will be described. The LTE-A system is a system that has been developed from an LTE system to meet IMT-Advanced conditions, which are the fourth generation mobile communication conditions recommended by the International Telecommunication Union-Radiocommunication Sector (ITU-R). At present, the LTE-A system standard is actively under development by 3GPP that has developed the LTE system standard. Representative technologies newly added in the LTE-A system mi carrier aggregation technology for extending a used bandwidth to be flexibly used, and relay technology for increasing coverage, supporting group mobility, and allowing network arrangement.

Figure 5:
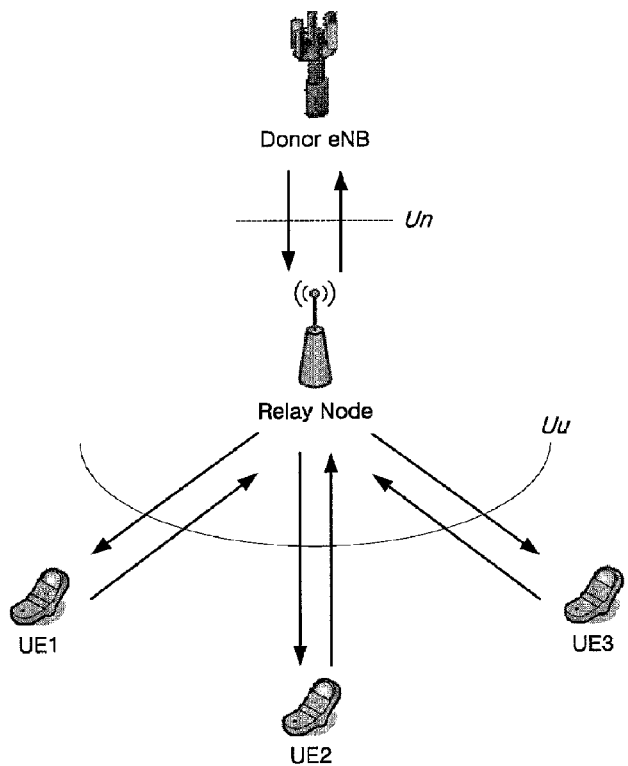
FIG. 5 is an exemplary view illustrating an relay node (RN) of the LTE-A (LTE-Advanced) system.

Here, relay is a technology for relaying data between a user equipment (EU) and an Evolved Node B (eNB, base station). Since communication is not smoothly implemented in case where a distance between UE and eNB is far in the LTE system, it is introduced in an LTE-A system as a method of making up for the problem. A new network node, which is referred to as Relay Node (RN), is introduced between UE and eNB to perform such a relay operation, wherein the eNB for managing RN is called Donor eNB (DeNB). In addition, an interface between RN-DeNB that has been newly added due to RN is defined as an Un interface, thereby being differentiated from a Un interface that is an interface between UE and a network node. FIG. 5 illustrates such a concept of Relay Node and an Un interface.

Here, the RN serves to manage UE in behalf of the DeNB. In other words, from a standpoint of the UE, the RN is shown as DeNB, and therefore, a MAC/RLC/PDCP/RRC, which is a Uu interface protocol that has been used in a conventional LTE system, are used as they are in a Uu interface between UE-RN.

From a standpoint of the DeNB, the RN may be shown as UE or shown also as eNB according to circumstances. In other words, when the RN is first accessed to the DeNB, it is accessed through random access like UE because the existence of the RN is unknown to the DeNB, but operated like eNB managing UE connected to itself after the RN is once accessed to the DeNB. Accordingly, along with the Uu interface protocol, the functions of the Un interface protocol should be also defined as in the form to which a network protocol function is also added. For the Un interface protocol, discussions as to which functions should be added or changed to each protocol layer on the basis of Uu protocols such as MAC/RLC/PDCP/RRC are still in progress in 3GPP.

Figure 6:
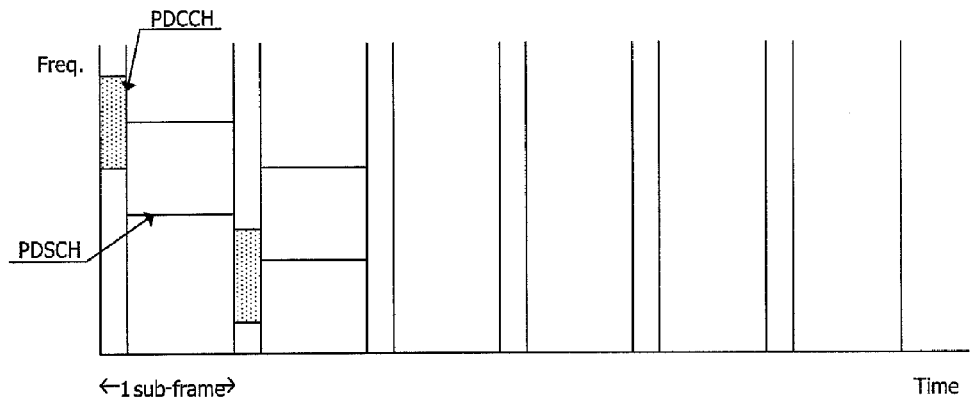
FIG. 6 is an exemplary view illustrating a method of receiving data in a downlink direction.

Next, there will be described a method in which the UE receives data in a downward direction in an LTE system. FIG. 6 is an exemplary view illustrating a method of receiving data in a downward direction.

As illustrated in FIG. 6, a physical channel in a downward direction can be roughly divided into two types, such as a Physical Downlink Control Channel (PDCCH) and a Physical Downlink Shared Channel (PDSCH). Here, control information, which is not directly related to the transmission of user data but required for operating a physical channel, is transmitted over the PDCCH. To explain most briefly, the PDCCH can be also used to control other physical channels. In particular, the PDCCH is used to transmit information that is required to receive the PDSCH. Information as to at a specific timing, data to be transferred using a specific frequency bandwidth, for a certain UE, a certain size of data to be transferred, and the like will be transmitted over the PDCCH. Accordingly, each UE receives the PDCCH at a specific Time Transmission Interval (TTI), checks whether or not data that should be received by itself is transmitted, and additionally receives the PDSCH using information such as the frequency indicated by the PDCCH, and the like if notified that data that should be received by itself is transmitted. Information as to data of the PDSCH to be transmitted to a certain UE(s) (a single or a plurality of UEs), how to receive and decode PDSCH data by the UEs, and the like can be included in a Physical Downlink Control Channel (PDCCH) to be transmitted.

For example, in a specific subframe, it is assumed that radio resource information (for example, frequency position) called "A" and transport type information (for example, transport block size, modulation and coding information, etc.) called "B" are CRC-masked to an Radio Network Temporary Identity RNTI (RNT) called "C", and transmitted via the PDCCH. One or two or more UEs located in the relevant cell monitor the PDCCH using their RNTI information, and on the above assumption, when the UE having the RNTI called "C" decodes the PDCCH, a CRC error does not occur. Thus, the UE decodes the PDSCH to receive data by using the transport type information called "B" and the radio resource information called "A". On the contrary, on the above assumption, if the UE does not have the RNTI called "C" when the PDCCH is decoded, a CRC error occurs. Thus, the UE does not receive the PDSCH.

In the above procedure, the Radio Network Temporary Identifier (RNTI) is transmitted to inform to which UEs radio resources have been allocated. The RNTI includes a dedicated RNTI and a common RNTI. The dedicated RNTI is allocated to a single UE and used to transmit or receive data corresponding to the UE. The dedicated RNTI is allocated only to the UE whose information has been registered in the base station. On the contrary, the common RNTI is used when UEs, which have not been allocated the dedicated RNTI because their information was not registered to the base station, transmit or receive data to or from the base station, or the common RNTI is used to transmit information commonly applied for a plurality of UEs.

Hereinafter, a RRC_IDLE state of the UE will be described in detail. The UE in the RRC_IDLE state should always select the cell having a suitable quality to be prepared to receive services through this cell. For example, the UE that has just powered on should select the cell having a suitable quality to be registered in a network. If the UE that has been in a RRC_CONNECTED state enters into RRC_IDLE, then the UE should select a cell to stay in RRC_IDLE. As described above, a process in which the UE selects the cell satisfying certain conditions to stay in a service waiting state such as the RRC-IDLE state is called cell selection.

Hereinafter, a method of selecting a cell by the UE will be described. When power is initially turned on, the UE searches available PLMNs and then selects a suitable PLMN capable of receiving services. Subsequently, the UE selects a cell having signal qualities and characteristics capable of receiving a suitable service among the cells provided by the selected PLMN. Here, the cell selection process is roughly divided into two types. First, for an initial cell selection process, the UE have no previous information about radio channels. Thus, the UE searches all radio channels to find a suitable cell. In each channel, the UE finds the strongest cell. Then, once the UE finds a suitable cell satisfying the cell selection criteria, the UE selects the relevant cell. Next, in a cell selection process using the stored information, a cell is selected by using information stored in the UE for radio channels or using information broadcast from the cells during the process.

Thus, a cell selection can be promptly performed compared to an initial cell selection process. Once the UE finds a suitable cell satisfying the cell selection criteria, the UE selects the relevant cell. If a suitable cell satisfying the cell selection criteria is not found through this process, then the UE performs an initial cell selection process.

Hereinafter, a process of reselecting a cell will be described. After a certain cell is once selected through a cell selection process, a signal intensity or quality between the UE and the base station may vary due to mobility of the UE, change of radio environments, or the like. Thus, if the quality of the selected cell is deteriorated, then the UE can select another cell providing a better quality. In case of reselecting a cell in this manner, the cell providing a better signal quality than the currently selected cell is typically selected. This process is called cell selection. The cell reselection process, from a viewpoint of the quality of a radio signal, has a basic purpose to typically select a cell providing the best quality to the UE. In addition to the viewpoint of the quality of a radio signal, a network can determine a priority for each frequency to inform the priority to the UE. The UE that has received such a priority preferentially considers this priority during the cell reselection process compared to the radio signal quality criteria.

Hereinafter, carrier aggregation (hereinafter, referred to as "CA") of an LTE-A system will be described.

Figure 7:
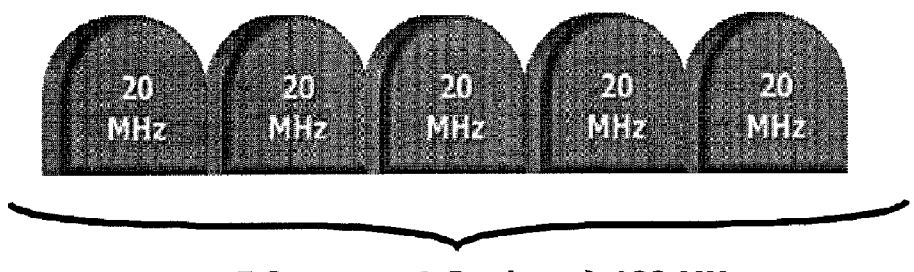
FIG. 7 is an exemplary view illustrating a carrier aggregation technology in the LTE-A system.

The LTE-A technical standard as an IMT-Advanced candidate technology of the International Telecommunication Union (ITU) is designed to meet the IMT-Advanced technical requirements. Accordingly, discussions for extending a bandwidth compared to the existing LTE system are in progress to satisfy the requirements of ITU. To extend a bandwidth in the LTE-A system, the carrier that can be possessed by the existing LTE system is defined as a component carrier (hereinafter, referred to as "CC"), and discussions are under way to use them by bundling up to five CCs. Since each CC may have a bandwidth up to 20 MHz, it is a concept that can be extended up to 100 MHz. The technology of bundling up a plurality of CCs to use them is called CA. FIG. 7 is an exemplary view illustrating the carrier aggregation technology in such an LTE-A system.

Figure 8:
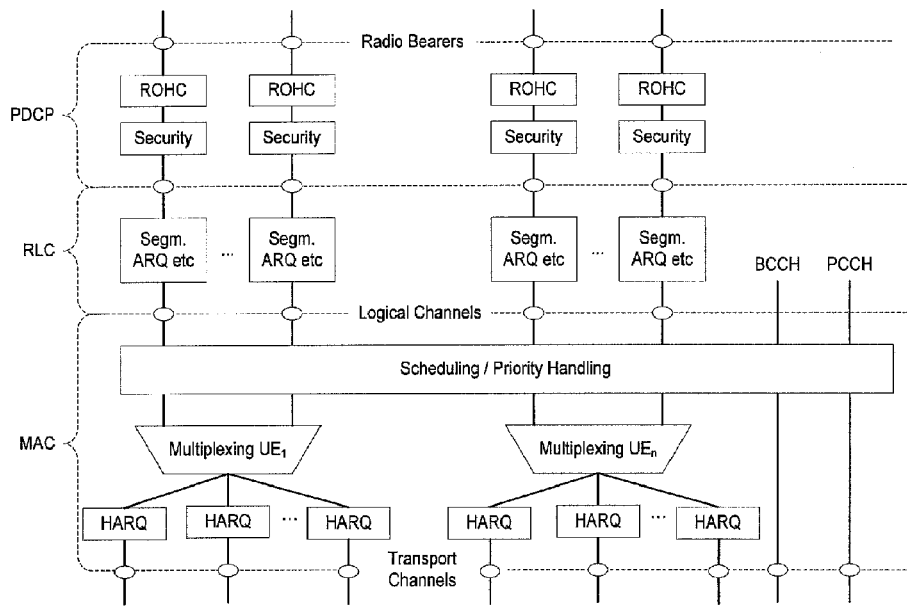
FIGS. 8 and 9 are exemplary views illustrating a downlink and an uplink protocol structure in consideration of the carrier aggregation technology.
Figure 9:
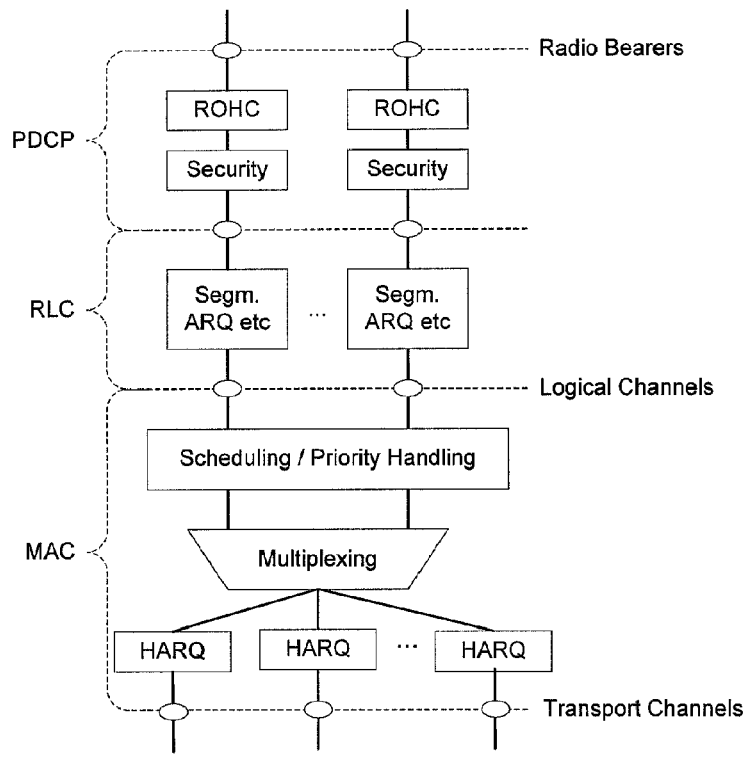

FIGS. 8 and 9 are exemplary views illustrating a downlink and an uplink protocol structure in consideration of the carrier aggregation technology. Typically, the CA technology to which the present invention is applied can greatly affects the MAC layer in Layer 2. For example, a plurality of CCs are used in CA, but a HARQ entity manages a single CC, and thus the operations related to a plurality of HARQ entities should be performed in the MAC layer of the LTE-A system. In addition, each of the HARQ entities independently processes a transport block, and thus a plurality of transport blocks can be transmitted or received at the same time through a plurality of CCs.

Next, measurement will be described. In a mobile communication system, it is essentially required to support the mobility of the UE. To support the mobility, the UE continues to measure the quality of a serving cell currently providing a service, and the quality for a neighboring cell adjacent to the serving cell. The UE transmits the measured result to a network at a suitable time, and the network provides the optimum mobility to the UE through a handover command, and the like, based on the measurement result value reported by the UE.

In addition to the purpose of mobility support, a mobile communication terminal performs a special purposed measurement procedure that has been set by a network to provide information capable of helping the service provider to administer a network, and then reports the measurement result to the network. For example, the UE receives broadcast information of a specific cell determined by a network to acquire identifier information of this cell (for example, global cell identity) or location identification information to which the relevant cell belongs (for example, tracking area code) and other cell information (for example, member or non-member in case of a closed subscriber group (CSG)), and then reports those information to the serving cell. Alternatively, in case where the UE confirms that the quality of a specific area is very bad during the movement, the UE may report the location information and measurement results for the cells having bad qualities to the network. A network may seek the optimization of the network based on the measurement result reports from the UEs for helping the management of the network.

In the form of managing a mobile communication system having a frequency reuse factor of 1, mobility is mostly implemented between different cells having the same frequency. Accordingly, in order to guarantee the mobility of the UE, the UE should be able to easily find cells having the same center frequency as the serving cell, and should be able to easily measure the quality and cell information of the found neighboring cells. The measurement for a cell using the same center frequency as the center frequency of the serving cell is called intra-frequency measurement. The UE performs intra-frequency measurement to report the measurement result at a suitable time, thereby accomplishing an object of the relevant measurement result.

The mobile communication service provider may manage a network using several frequencies. In case where a service of the mobile communication system is provided through several frequencies in this manner, in order to guarantee the optimized mobility to the UE, the UE should be also able to find cells having a different frequency from the serving cell, and should be able to easily measure the quality and cell information of the found neighboring cells. The measurement for a cell using a different center frequency from the center frequency of the serving cell is called inter-frequency measurement. The UE should be able to perform inter-frequency measurement to report the measurement result at a suitable time.

If the UE supports the measurement for a mobile communication network, then the measurement of the mobile communication network can be implemented by the setting of the base station. At present, from a viewpoint of the LTE terminal, inter-RAT may include UTRA and GERAN according to the 3GPP standard specification, and may also include a CDMA 2000 system according to the 3GPP2 standard specification.

Figure 10:
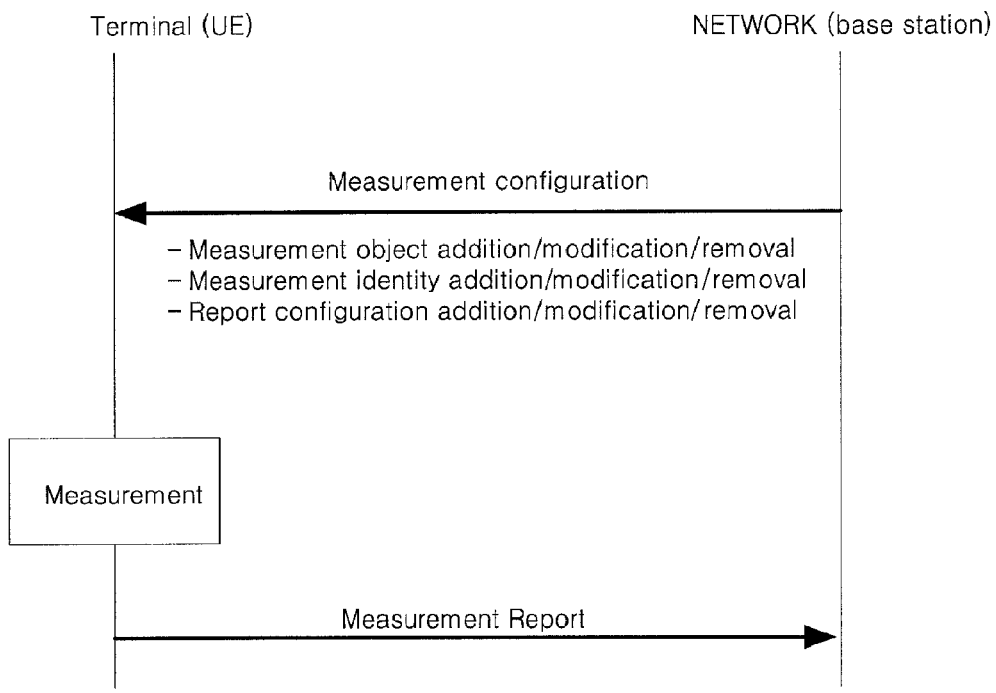
FIG. 10 is an exemplary view illustrating a measurement configuration and measurement report procedure to which the present invention is applied.

FIG. 10 is an exemplary view illustrating a measurement configuration and measurement report procedure to which the present invention is applied.

As illustrated in FIG. 10, the UE determines a measurement object according to the measurement configuration (hereinafter, measurement setting) that has been set by the base station, and reports the measurement result. In other words, if the UE receives a Measurement Configuration message or a message corresponding to the message, then the UE performs measurement according to this. As a result of the measurement, if measurement result report conditions included in the measurement configuration are satisfied, then the measurement result is transmitted through a Measurement Report (MR) or a message corresponding to the message.

Here, the measurement configuration may include the following parameters.

Measurement objects: A parameter for determining an
        object to be measured by the UE. A measurement object to be set from a standpoint of the UE is one of an intra-frequency measurement object, an inter-frequency measurement object, and an inter-RAT measurement object.

Reporting configurations: A parameter for determining the reference and report type as to when the UE should perform the transmission of a measurement result report message (i.e., report trigger).

Measurement identities: An identification parameter for determining when the UE reports to which object with which method by connecting a specific measurement object with a specific reporting configuration. The measurement identity is also included in a measurement result transmission message, indicating for which object the measurement result included in the relevant message is provided, and by which cause (report trigger) the transmission of the measurement result message has been generated.

Quantity configurations: A parameter for setting the measurement unit/report unit and setting a filter value to filter the measurement result values.

Measurement gaps: A time to be used by the UE to only measure without worrying about data transmission with the serving cell caused by not scheduling downlink or uplink transmission.

The UE has a measurement object list, a measurement reporting configuration list, and a measurement identity list for the measurement procedure. Typically, an E-UTRAN base station can set only one measurement object with respect to a single frequency for the UE.

As described above, in the related art, a data transmission has to be terminated when a terminal changes it cell. In order to solve such drawback of the related art, according to the present invention, the terminal may change its cell gradually so as to minimize a data transfer interruption (i.e., termination of a data transmission). That is, if the terminal receives a handover command instructing the terminal to change its cell from a base station, the terminal may select a specific frequency among a plurality frequencies configured for the terminal. Here, the selected frequency may be used for performing an operation of cell change (i.e., handover), and other frequencies may be used for a data transfer (i.e., data transmission) between the terminal and the base station. Namely, for the selected cell, the terminal may terminate its data transmission to a source cell, and may search for a new cell within the selected frequency. After searching of the new cell, the terminal may perform a handover complete operation into a corresponding cell. Here, the handover complete operation may refer to a random access procedure performance or a handover complete message transmission. And, for the all other unselected frequencies, the terminal may continuously perform the data transfer with an existing cell until all of the handover procedures are completed in the selected frequency. During the above procedure, the selected frequency may be selected by the terminal or may be designated by using a handover message transmitted from the base station. Namely, if the terminal receives the handover message from the base station and if the handover message includes information indicating a specific frequency to be selected, the handover procedure is performed within the selected frequency.

Figure 11:
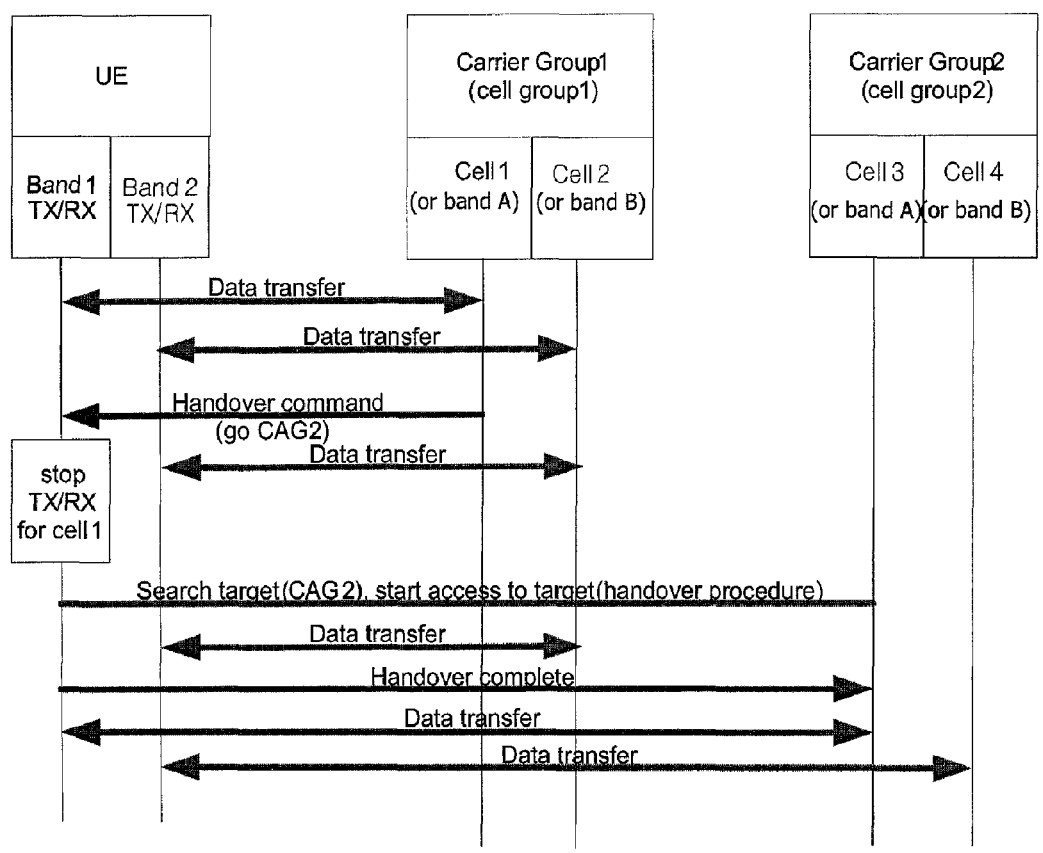
FIG. 11 is an exemplary view illustrating an improved method of performing a handover procedure in a LTE-A system according to the present invention.

FIG. 11 is an exemplary view illustrating an improved method of performing a handover procedure in a LTE-A system according to the present invention.

In the FIG. 11, the CAG may be referred to a carrier aggregation group that performs an operation of the carrier aggregation. As shown in the FIG. 11, the terminal (UE) initially communicates with a cell group 1, and the cell group 1 includes a cell 1 (for a band A) and a cell 2 (for a band B). Further, the terminal includes two RX/TX (reception/transmission) circuits, and the first RX/TX circuit is connected to the cell 1 and the second RX/TX circuit is connected to the cell 2. Firstly, the terminal receives a handover command from a network (CAG 1) to move its cell to a CAG 2. Here, the CAG 2 includes a cell 3 (for a band A) and a cell 4 (for a band B). Thereafter, the terminal may instruct the first RX/TX circuit to terminate a communication with the cell 1, and may instruct the first RX/TX circuit to search the cell 3 of CAG 2, which is corresponded with the cell 1 of CAG 1, for accessing the cell 3. After searching of the cell 3 is completed, the terminal may perform a RACH procedure in the cell 3 or a handover complete message transmission. While the first RX/TX circuit changes its access from the cell 1 o the cell 3, the second RX/TX circuit may continuously perform the data transfer with the cell 2. After the first RX/TX circuit successfully completes the handover procedure, the second RX/TX circuit may terminate the data transfer with the cell 2, rather the second RX/TX circuit may perform the data transfer with the cell 4, which is corresponded with the band B of the CAG 2.

In the above procedure, the first RX/TX circuit was selected to perform the handover procedure in the band 1. Here, such selection may be randomly made or may be instructed by a handover command transmitted from the network. For example, the RACH information may be transmitted when the network transmits the handover command to the terminal. Here, frequency information corresponded to the RACH information may be additionally transmitted from the network to the terminal. As such, according to the frequency information related to the RACH, the terminal may be notified that which band or which frequency or which RX/TX circuit should be used for performing the handover procedure or for terminating the data transfer with a current existing cell.

The present invention may also propose a method of reducing an amount of measurement report. For example, for a cell group that comprised by a plurality of cell or a plurality of carrier, if the terminal measures a quality for all of the plurality of cell, a size of measurement report will be extremely large, and this may request a large amount of radio resources. Therefore, instead of measuring the quality for all cells, the present invention proposes to measure the quality of one cell among the cell group. This can be possible because those cells belong to the cell group are usually positioned in very similar geographical areas. Namely, if the quality of one cell is measured, a quality for other cells belonged in the cell group may be easily estimated based on the measurement report of the one cell.

Further, according to the present invention, configuration information of neighboring cells may be notified to a terminal by a network (i.e., base station). Here, the configuration information may indicate which cell is belonged to a which cell aggregation group (CAG), and the configuration information may be transmitted to the terminal via system information. If the terminal receives information related to the CAG, the terminal may generate a measurement report based on the CAG information, and may transmit it to the network. In other words, the terminal may generate the measurement report by the CAG level rather than generating the measurement report by the cell level. Here, if the terminal transmits a measurement report for a certain cell (i.e., sample cell) in the CAG, a measurement report for other cells included in the CAG may be omitted. Here, a measurement report for a best or a worst quality cell may be transmitted to the network as the sample cell. Also, the network may order the terminal that a measurement for which cell of the CAG should be reported or which frequency of cells should be reported. Here, the terminal may perform the measurement report only for those cell or frequency instructed by the network. For example, according to the present invention, the network may instruct the terminal to report a measurement for the best or worst quality cell.

According to the present invention, the handover procedure can be performed without interrupting the data transfer such that a speed of the data transfer can be increased and a quality of service provided to the terminal can be improved.

The present disclosure may provide a method of performing a handover procedure in a wireless communication, the method comprising: transferring data using a plurality of different frequencies; receiving a handover command from a serving cell, wherein the handover command includes target cell information, wherein the handover command further includes frequency information indicating a termination of the data transfer from the serving cell, and wherein the frequency information is related with at least one of the plurality of different frequencies; and transmitting a handover response to a target cell using the at least one of the plurality of different frequencies terminating the data transfer, wherein the handover response is transmitted to perform a random access procedure with the target cell, a handover complete message is received from the target cell after the completion of the random access procedure, the data is transferred to the serving cell until the handover complete message is received from the target cell, the at least one of the plurality of different frequencies terminating the data transfer is assigned by a network, the at least one of the plurality of different frequencies terminating the data transfer is assigned by a terminal, and the all of the steps are performed in a LTE-A (Long Term Evolution System-Advanced) system.

Hereinafter, a terminal according to the present invention will be described.

A terminal according to the present invention may includes all types of terminals capable of using services that can transmits and/or receives data to and/or from each other in a wireless environment. In other words, a terminal according to the present invention may be used in a comprehensive meaning by including a mobile communication terminal (for example, user equipment (UE), portable phone, cellular phone, DMV phone, DVB-H phone, PDA phone, PTT phone, and the like), a notebook, a laptop computer, a digital TV, a GPS navigation, a portable gaming device, an MP3, other home appliances, and the like.

A terminal according to the present invention may include a basic hardware architecture (transmission and/or reception unit, processing or control unit, storage unit, and the like) required to perform the function and operation for effectively receiving the system information as illustrated in the present invention.

The method according to the present invention as described above may be implemented by software, hardware, or a combination of both. For example, the method according to the present invention may be stored in a storage medium (for example, internal memory, flash memory, hard disk, and the like, in a mobile terminal or base station), and may be implemented through codes or instructions in a software program that can be implemented by a processor (for example, microprocessor, in a mobile terminal or base station), and the like.

Although the present disclosure is described in the context of mobile communications, the present disclosure may also be used in any wireless communication systems using mobile devices, such as PDAs and laptop computers equipped with wireless communication capabilities (i.e. interface). Moreover, the use of certain terms to describe the present disclosure is not intended to limit the scope of the present disclosure to a certain type of wireless communication system. The present disclosure is also applicable to other wireless communication systems using different air interfaces and/or physical layers, for example, TDMA, CDMA, FDMA, WCDMA, OFDM, EV-DO, Wi-Max, Wi-Bro, etc.

The exemplary embodiments may be implemented as a method, apparatus or article of manufacture using standard programming and/or engineering techniques to produce software, firmware, hardware, or any combination thereof. The term "article of manufacture" as used herein refers to code or logic implemented in hardware logic (e.g., an integrated circuit chip, Field Programmable Gate Array (FPGA), Application Specific Integrated Circuit (ASIC), etc.) or a computer readable medium (e.g., magnetic storage medium (e.g., hard disk drives, floppy disks, tape, etc.), optical storage (CD-ROMs, optical disks, etc.), volatile and non-volatile memory devices (e.g., EEPROMs, ROMs, PROMs, RAMs, DRAMs, SRAMs, firmware, programmable logic, etc.).

Code in the computer readable medium may be accessed and executed by a processor. The code in which exemplary embodiments are implemented may further be accessible through a transmission media or from a file server over a network. In such cases, the article of manufacture in which the code is implemented may comprise a transmission media, such as a network transmission line, wireless transmission media, signals propagating through space, radio waves, infrared signals, etc. Of course, those skilled in the art will recognize that many modifications may be made to this configuration without departing from the scope of the present disclosure, and that the article of manufacture may comprise any information bearing medium known in the art.

As the present disclosure may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalents of such metes and bounds are therefore intended to be embraced by the appended claims.

The invention claimed is:

1. A method of performing a handover procedure in a wireless communication, the method comprising:
   transferring data to a serving cell using a plurality of different frequencies, wherein the plurality of different frequencies are used in a carrier aggregation scheme supported by a LTE-A (Long Term Evolution System-Advanced) system;
   receiving a handover command from the serving cell,
   wherein the handover command includes target cell information,
   wherein the handover command further includes frequency information indicating a termination of data transfer from the serving cell,
   wherein the frequency information indicates a specific frequency among the plurality of different frequencies on which the data transfer from the serving cell should be terminated, and
   wherein the data transfer from the serving cell on the specific frequency is terminated after the reception of the handover command while data transfer from the serving cell on frequencies other than the specific frequency is maintained; and
   transmitting a handover response to a target cell to perform a random access procedure with the target cell, wherein the handover response is transmitted to the target cell using the specific frequency, wherein a handover complete message is received from the target cell after completion of the random access procedure, and wherein the data transfer from the serving cell on the frequencies other than the specific frequency is maintained until the handover complete message is received from the target cell.

2. The method of claim 1, wherein the specific frequency is assigned by a network.

3. The method of claim 1, wherein the specific frequency is assigned by a terminal.

\* \* \* \* \*